United States Patent [19]

He et al.

[11] Patent Number: 5,130,843

[45] Date of Patent: Jul. 14, 1992

[54] ACOUSTO-OPTICAL DEVICE USING A SUPERLATTICE AS THE INTERACTION MEDUIM

[75] Inventors: Jianjun He, Halifax, Canada; Jacques Sapriel, Levallois, France

[73] Assignee: French State represented by the Minister of Post, Telecommunications and Space

[21] Appl. No.: 538,380

[22] Filed: Jun. 14, 1990

[30] Foreign Application Priority Data

Jun. 15, 1989 [FR] France .................. 89 07958

[51] Int. Cl.⁵ .................. G02F 1/11; H01L 27/12
[52] U.S. Cl. .................. 359/285; 359/286; 359/305; 357/4
[58] Field of Search .................. 350/358, 96.13, 96.14; 357/4, 24, 30 E, 30 L, 30; 359/285, 305, 307, 286; 385/7

[56] References Cited

U.S. PATENT DOCUMENTS

| | | | |
|---|---|---|---|
| 4,090,204 | 5/1978 | Farhat | 350/358 |
| 4,257,016 | 3/1981 | Kramer, Jr. et al. | 350/358 |
| 4,327,962 | 5/1982 | Redman | 350/358 |
| 4,339,821 | 7/1982 | Coppock et al. | 350/358 |
| 4,342,502 | 8/1982 | Chang | 350/358 |
| 4,532,632 | 7/1985 | Yamashita et al. | 350/358 |

OTHER PUBLICATIONS

Ohmachi, Y.; "Acousto-optical light diffraction in thin films"; J. Appl. Phys., vol. 44 No. 9 Sep. 1973 pp. 3928-3933.
Soviet Physics Acoustics, vol. 33, No. 1, Jan.-Feb. 1987, pp. 76-78 (Kikkarin et al.).
Proc. of the IEEE, vol. 64, No. 12, Dec. 1976, pp. 1666-1993 (Elachi).
J. of Applied Physics, vol. 38, No. 13, Dec. 1967, pp. 5149-5153 (Dixon).
Applied Optics, vol. 27, No. 11, Jun. 1, 1988, pp. 2103-2104 (Simes et al.).
Physical Review B, vol. 37, No. 8, Mar. 1988, pp. 4086-4098 (He et al.).
J. Appl. Phys., vol. 59, No. 10, May 1986, pp. 3344-3355, (Russell).

Primary Examiner—Eugene R. LaRoche
Assistant Examiner—Evelyn A. Lester
Attorney, Agent, or Firm—Michael N. Meller

[57] ABSTRACT

This device comprises a photoelastic interaction medium between an incident light beam (28) and at least one acoustic or sound wave, as well as means (4, 6) for producing the acoustic or sound wave. The interaction medium is a superlattice (18), which is transparent to the light beam and whose period is close to an integral multiple of half the wavelength of the light beam in the superlattice.

Application to the production of acousto-optical deflectors and modulators.

11 Claims, 6 Drawing Sheets

ACOUSTO-OPTICAL DEVICE USING A SUPERLATTICE AS THE INTERACTION MEDUIM

DESCRIPTION

The present invention relates to an acousto-optical device using a superlattice as the interaction medium. It more particularly applies to the production of acousto-optical deflectors and modulators.

The term "superlattice" is understood to mean a succession of alternating layers of at least two different materials or a succession of alternating strips of at least two different materials.

In the first case, the superlattice is a stack of layers along an axis which is called the "superlattice axis". The number of materials is generally 2, so that there is a stack of alternating layers of two different materials of respective thicknesses d1 and d2. The stack is then periodic, of period d1+d2, along its axis, which is perpendicular to the layers.

In the second case, the superlattice is called a "lateral superlattice" and the number of materials is also generally 2. Thus, there is a succession of alternating strips of two different materials, of respective widths d1 and d2, deposited on the surface of a substrate. The superlattice is then periodic, of period d1+d2, along an axis parallel to the substrate surface and perpendicular to the strips and which is also called the superlattice axis.

Acousto-optics is a procedure offering both deflection and modulation possibilities for a laser beam (cf. document (1) which, like the other documents cited hereinafter, is mentioned at the end of the present description). The use of this procedure only requires relatively low voltages of approximately 10 V.

Known acousto-optical devices use, as interaction media, solid or thin film homogeneous media constituted by a material such as e.g. $TeO_2$, $PbMoO_4$, GaAs or $LiNbO_3$. In such media, the coupling of the light with the ultrasonics takes place under conditions where the wave vector conservation rule is verified (phase tuning condition), namely:

$$\bar{k}d = \bar{k}i + \bar{K} \quad (1)$$

in which $\bar{k}i$, $\bar{k}d$ and $\bar{K}$ are respectively the wave vectors of the incident light, the diffracted light and the sound wave. As the modulus of $\bar{K}$ is well below the modulus of $\bar{k}i$, the latter differing only slightly from the modulus of $\bar{k}d$, the interaction occurs when the light and the ultrasonic wave propagate in quasi-perpendicular directions.

The two most important characteristics of acousto-optical devices are the efficiency (ratio of the diffracted lighting power to the incident lighting power) and the pass band. In the case of modulators, the pass band determines the highest accessible modulation frequency, which limits the transmission speed of information in the case of telecommunications. In the case of deflectors, the pass band determines the number of separable deflection positions (capacity) and the switching speed between these positions. The pass band of an acousto-optical device is inversely proportional to the interaction length between the light beam and the sound wave, contrary to the efficiency which increases with this parameter.

The major disadvantages of known acousto-optical devices is the difficulty of having both a large pass band and a high efficiency.

The object of the present invention is to obviate this disadvantage by proposing a compact acousto-optical device having a large pass band, whilst retaining a high efficiency. To this end, the present invention uses a superlattice of an appropriate period.

More specifically, the present invention relates to an acousto-optical device having a photoelastic interaction medium between an incident light beam and at least one sound wave, as well as means for producing the sound wave, characterized in that the interaction medium is a superlattice, which is transparent to the light beam and whose period is close to an integral multiple of half the wavelength of the light beam in the superlattice.

In the acousto-optical device according to the invention use is made of a superlattice as the interaction medium, in place of a solid material. The phase tuning condition for the light-ultrasonic coupling is then assisted by a vector of the reciprocal lattice of the superlattice making it possible to write:

$$\bar{k}d = \bar{k}i + \bar{K} + (2m\pi/D)\bar{z}o \quad (2)$$

in which $\bar{z}o$ is the unit vector of the axis of the superlattice, D the period of the superlattice and m a positive, negative or zero integer. This type of interaction between the light and the phonons (sound waves due to thermal agitation) has been revealed by Raman and Brillouin diffusion (cf. documents (2) and (3)). The intervention of a vector of the reciprocal lattice in the phase tuning condition (equation (2)) makes it possible to bring about the light-ultrasonic coupling in a quasi-colinear configuration, which is impossible in homogeneous solid media.

Moreover, the device according to the invention uses a superlattice as a Fabry-Pérot resonator in order to increase the effectiveness of the light-ultrasonic coupling. Such a resonance effect has already been used in electrooptical devices (cf. document (4)) and in non-linear optical devices (cf. document (5)), but never in acousto-optical devices. Moreover, the Fabry-Pérot resonators used previously were all formed by two dielectric mirrors or by two semiconducting superlattices, whereas in the present invention the resonator is constituted by a single superlattice, which at the same time serves as an acousto-optical interaction medium.

Thus, in the invention, D is only slightly different from (p.$\frac{1}{2}$), in which l is the wavelength of light in the superlattice and p is a positive interger of e.g. 1.

For example, using a GaAs-AlAs superlattice with appropriately chosen structural parameters, the present invention makes it possible to obtain a device with a pass band approximately ten times higher than that of devices using GaAs in the solid state and having comparable control power and efficiency characteristics. The device obtained is also much more compact than the known devices.

Moreover and in general terms, the present invention makes it possible to produce volume sound wave devices, which are more compact than the prior art volume sound wave devices. Preferably, in the device according to the invention, at least one of the materials constituting the superlattice has a high acousto-optical merit factor at least equal to approximately ten times that of silica.

According to a special embodiment of the device according to the invention, the superlattice is formed on one face of a substrate, whose other face, called the free face, carries the means for producing the sound wave. The free face of the substrate can be parallel to the superlattice layers or can be slightly inclined with respect thereto (the angle of inclination being a few degrees).

The means provided for producing the sound wave can comprise a piezoelectric transducer.

As a variant, the device can comprise an array of piezoelectric transducers for respectively producing sound waves which are independent of one another.

According to an embodiment of the device according to the invention, the superlattice is formed on one face of a substrate and carries the means for producing the sound wave, the latter comprising a surface sound wave transducer able to produce in said superlattice sound waves propagating parallel to the superlattice layers.

According to another embodiment of the device according to the invention, the latter also comprises a substrate and an optical wave guide carried by the substrate, the superlattice being a lateral superlattice formed in the wave guide and the latter carries the means for producing the sound wave, said means comprising a surface sound wave transducer able to produce in the said lateral superlattice sound waves propagating parallel to the axis of said lateral superlattice or obliquely with respect thereto. The superlattice can be a semiconducting superlattice.

Finally, the light beam is preferably a laser beam (particularly due to the fact that a laser directly supplies monochromatic light).

The invention is described in greater detail hereinafter relative to non-limitative embodiments and the attached drawings, wherein show:

FIG. 3A Variations, as a function of the wavelength of light, of the optical energy density gain in a superlattice compared with the incident light beam.

FIG. 5A Diagrammatically a known acousto-optical device and FIG. 5B the wave vector conservation rule in the device.

FIG. 6A Diagrammatically an acousto-optical device according to the invention and FIG. 6B the wave vector conservation rule in the device.

According to the present invention a superlattice having at least one good acousto-optical material is used as the interaction medium. For example, in the case of GaAs-AlAs superlattices, the GaAs constitutes a good acousto-optical material in the near infrared (cf. document (6)). On considering a device according to the invention using volume sound waves, the light-ultrasonic interaction length is limited to the thickness of the superlattice, which is much smaller than the corresponding size of known devices. This gives a high pass band. The period of the superlattice is chosen (close to an integral multiple of a half-wavelength of the incident light beam), in such a way that an optical resonance effect occurs, which greatly increases the optical energy density in the interaction medium and consequently the efficiency of the device according to the invention.

The optical resonance effect and the intervention of a vector of the reciprocal lattice of the superlattice in the phase tuning condition for the light-ultrasonic coupling are two essential phenomena according to the invention. A more detailed description thereof will be given hereinafter and a comparison is made between the solid medium and superlattice with regards to the acousto-optical interaction.

The effect of a Fabry-Pérot optical resonator in a superlattice will firstly be considered. A given superlattice formed on a substrate can serve as an optical resonator for certain well chosen light wavelengths close to 2 D. Within the superlattice the optical waves are Bloch waves, whose amplitude is periodic and of the same period as the superlattice. The difference between Bloch waves and plane waves (constant amplitude) becomes increasingly marked on approaching the end $\pi/D$ of the Brillouin zone in space of k. In this region, the free surface of the superlattice and the superlattice-substrate interface act as high reflectivity mirrors for the Bloch waves. There is then a strong light energy concentration in the superlattice, as within an optical resonator.

Consideration will be given to a superlattice constituted by alternate layers of GaAs (thickness $d_1 = 84$ nm) and AlAs (thickness $d_2 = 56$ nm) and a study will be made of the propagation of the light waves for wavelengths for which GaAs and AlAs are transparent.

Figure 1:
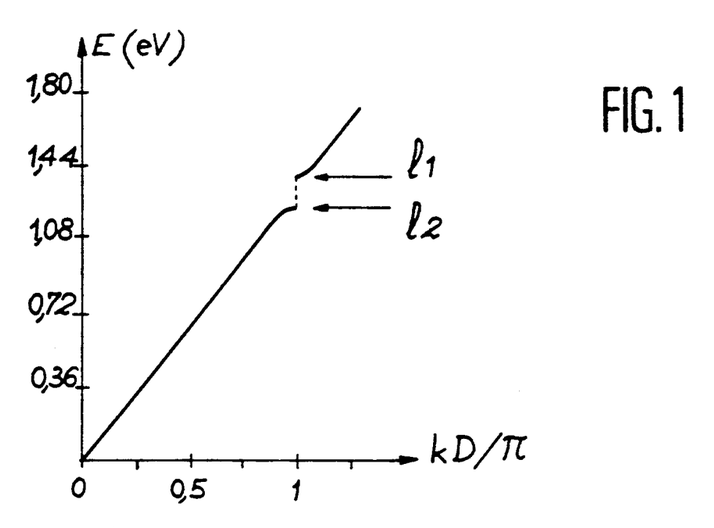
FIG. 1 A light dispersion curve for a propagation along the axis of a superlattice.

In FIG. 1 has been plotted the light dispersion curve for a propagation along the superlattice axis. For wavelengths between 887.5 and 992 nm, the BLOCH wave vector of the light in the superlattice is represented by a complex number, corresponding to an evanescent light wave.

Figures 2, 3:
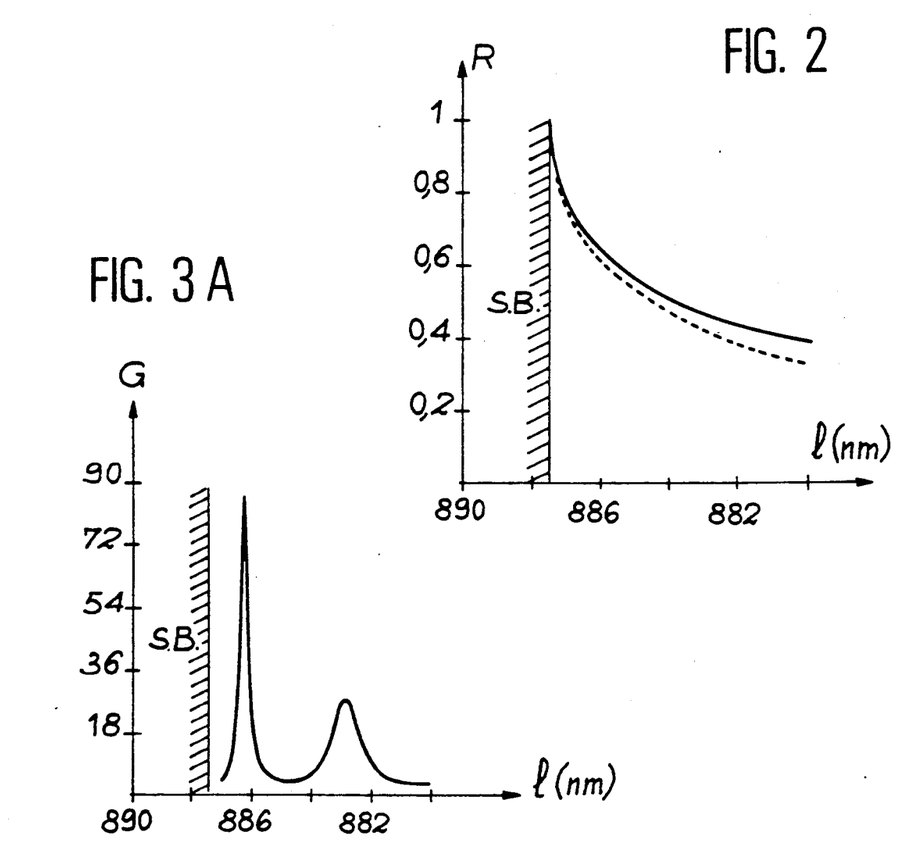
FIG. 2 Variations, as a function of the wavelength of light, of the reflection coefficient, with normal incidence of the BLOCH light wave, at the superlattice-air and superlattice-substrate interface.

This wavelength interval is called the stop band (and designated SB in the drawings) or "optical forbidden band". The real part of the BLOCH wave vector corresponding to SB is equal to $\pi/D$. This value is the limit of the first Brillouin minizone of the superlattice. The air-superlattice and superlattice-substrate interfaces (generally the substrate is GaAs) serve as mirrors around $k = \pi/D$, because they have a reflecting power close to 1 in said region for the Bloch wave in the superlattice, as can be seen in FIG. 2.

On the latter has been plotted the reflection coefficient R with normal incidence of the Bloch wave at the superlattice-air interface (continuous line) and superlattice-substrate interface (dotted line) as a function of the wavelength 1 of light and it is possible to see that the reflectivity is very high in the vicinity of the forbidden band.

Figure 3B:
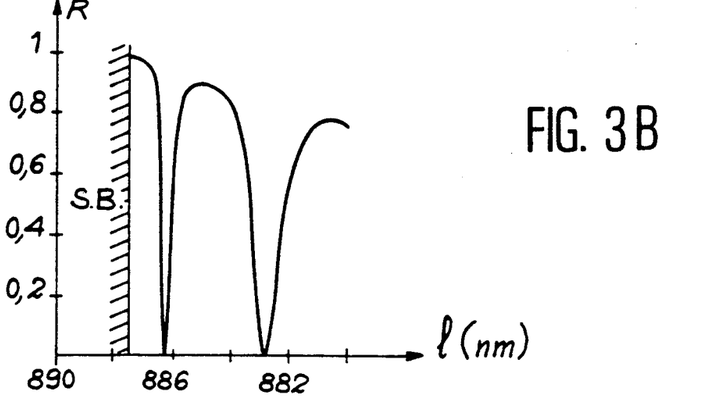
FIG. 3B Variations, as a function of the wavelength of light, of the reflection coefficient of the superlattice of FIG. 3A.

The light energy density gain G in the superlattice (with a number N of periods equal to 75) compared with that of the incident beam in vacuo is indicated in FIG. 3A. The peaks corresponding to the wavelengths of light satisfy the resonance condition. When said resonance condition is verified, the reflectivity R of the superlattice is at a minimum (FIG. 3B), as in the case of an ordinary Fabry-Pérot resonator constituted by two facing mirrors.

Figures 4, 7:
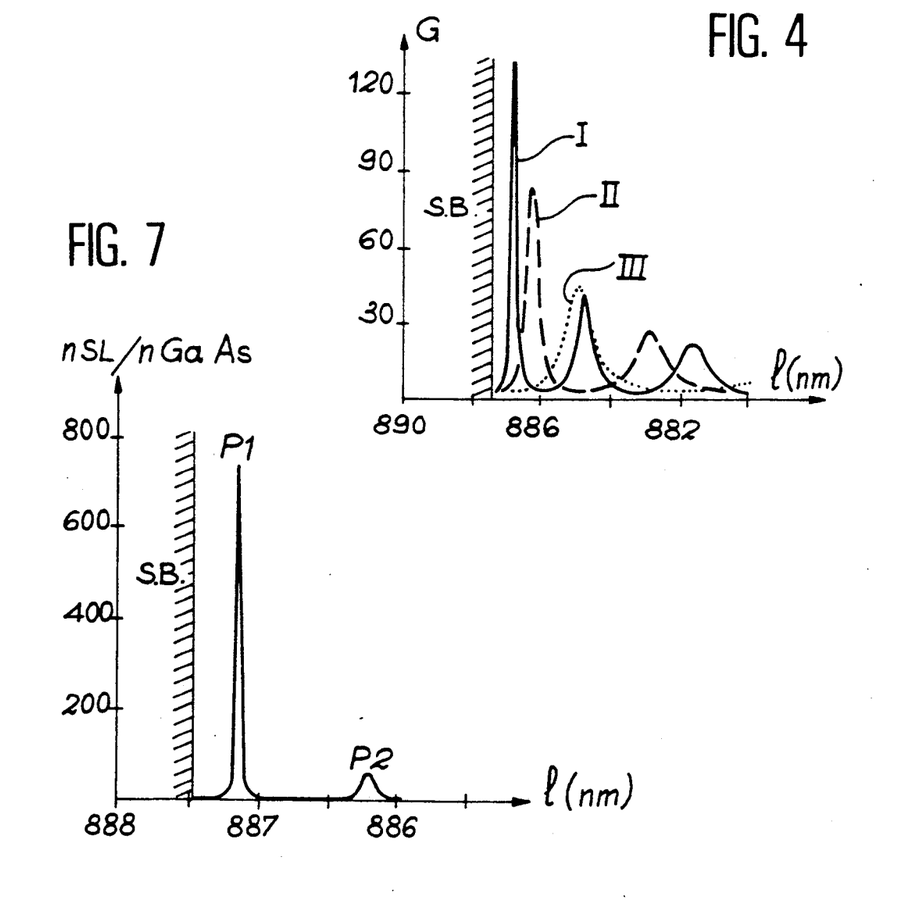
FIG. 4 Variations, as a function of the wavelength of light, of the optical energy density gain in a superlattice compared with the incident light beam for different values of the number of periods in the superlattice.
FIG. 7 Variations, as a function of the wavelength of light, of the optimum diffraction efficiency in a GaAs-AlAs superlattice compared with that of solid GaAs.

FIG. 4 shows the fineness and amplitude of the resonance peaks increasing with the number N of periods of the superlattice. The curves I, II and III respectively correspond to period numbers $N1=100$, $N2=75$ and $N3=50$. It can also be seen that the intensity of the resonance increases as it approaches the forbidden band frequency.

All the above results are obtained from calculating the propagation of light in the air-superlattice-substrate system on starting with Maxwell equations and continuity conditions of the electric and magnetic fields at the different interfaces. The example has been used of a GaAs-AlAs superlattice with d1 (GaAs)=84 nm and d2 (AlAs)=56 nm, because GaAs is a good acousto-optical material in the infrared. The period D of this superlattice was chosen so that the resonances are in wavelengths where GaAs is transparent and in the range of use of a tunable dye laser LDS21 (approximately 800 to 900 nm). Experimentally, the wavelength of the tunable laser is displaced in such a way as to obtain resonance conditions of the superlattice resonator (corresponding to the peaks of FIG. 4). The ratio between the thicknesses of GaAs and AlAs was chosen in order to optimize the acousto-optical interaction in the superlattice resonator cavity, as will be shown hereinafter.

Obviously all these results can be generalized relative to other superlattice types (e.g. GaInAs/InP) and other wavelengths, which could be of greater interest for certain applications and in particular those relating to optical telecommunications at 1.3 and 1.5 micrometre.

The acousto-optical interaction and the comparison between a homogeneous medium and a superlattice will now be discussed. The mechanism of the interaction of light with an ultrasonic wave is based on the photoelastic effect. When a sound wave propagates in a material, there is an associated state of stress leading to a periodic disturbance of the refractive index in the medium. This index disturbance acts like a volume optical lattice for a light wave propagating in the medium and gives rise to a light beam diffracted at the frequency $fd=fi+F$ (fi and F being respectively the frequency of the incident light beam and that of the sound wave). Diffraction is only effective if the phase tuning condition is satisfied. The phase tuning condition ensures that the lights diffracted at the different points of the medium are in phase and constructionally interfere.

In a homogeneous medium, the phase tuning condition is given by the moment conservation rule, i.e. $\bar{k}d=\bar{k}i+\bar{K}$, $\bar{k}i$, $\bar{k}d$ and $\bar{K}$ being respectively the wave vector of incident light, that of the diffracted light and that of the sound wave. As the modulus of the sound wave vector is much smaller than the moduli of the vector $\bar{k}i$ and $\bar{k}d$, the interaction can only take place in the configuration where the light beams and the sound wave are virtually perpendicular. This is revealed by FIGS. 5A and 5B.

Figure 5:
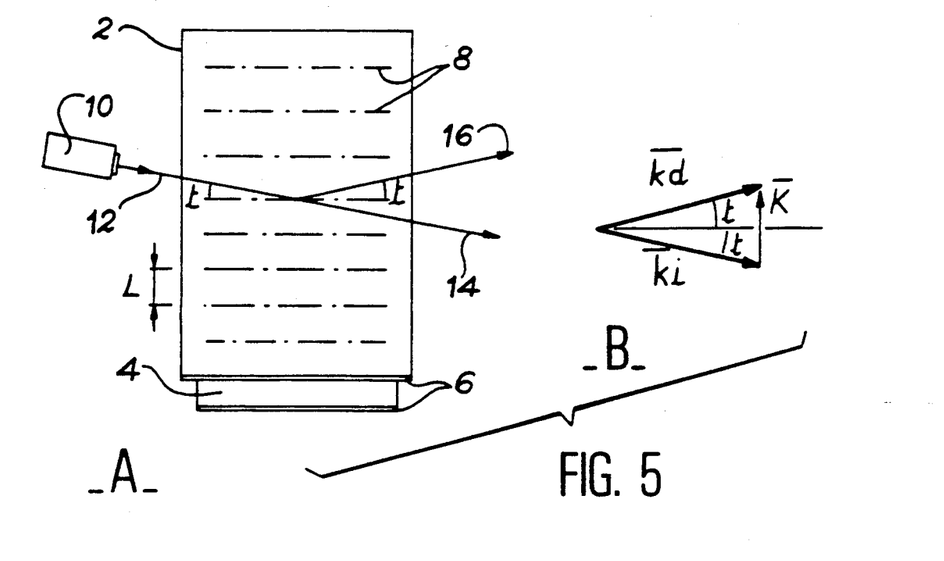

FIG. 5A shows a known elementary or unit acousto-optical cell having a block 2 of a photoelastic material and a piezoelectric transducer 4 placed against the face of the block 2. The transducer 4 is e.g. a LiNbO$_3$ strip, whose two faces carry metal electrodes 6, one of the said electrodes being in engagement with said face of the block 2. When the transducer 4 is excited, a sound wave is produced in the block 2. The wave planes carry the reference 8 and the distance between the two adjacent wave planes is designated L. By means of a laser 10, a light beam 12 is supplied to the block 2, which is assumed to be transparent to the light of laser 10. The incident beam 12 forms an angle t with the planes 8, t generally being below 1° and corresponding to what is called BRAGG incidence. The transmitted beam 14 and the diffracted beam 16 also form angles t with these planes.

In a superlattice, due to the artificial periodicity, the phase tuning condition becomes:

$$\bar{k}d=\bar{k}i+\bar{K}+(2m\pi/D)\bar{z}o$$

($m=0, \pm 1, \pm 2, \ldots$). In this $\bar{z}o$ is the unit vector along axis Z of the superlattice and $(2m\pi/D)\bar{z}o$ is a vector of the reciprocal lattice parallel to Z. The intervention of the artificial period D in the phase tuning conditions permits the interaction of the light with the sound wave in a quasi-colinear configuration along the superlattice axis. For example, for $m=\pm 1$, when $\bar{k}i$ is opposed to $\bar{k}d$ and only slightly different from $(\pi/D)\bar{z}o$, the modulus of the sound wave vector is very small compared with that of the vector $\bar{k}i$. Consequently, the frequency of the sound wave under coupling conditions can be reduced in the ultrasonic range produced by a piezoelectric transducer (i.e. 50 MHz to approximately 1 GHz). This type of low frequency interaction, assisted by a vector of the reciprocal lattice was predicted and observed (cf. documents (2) and (3)) in light diffusion experiments by folded acoustic phonons. This interaction is illustrated by FIGS. 6A and 6B.

Figure 6:
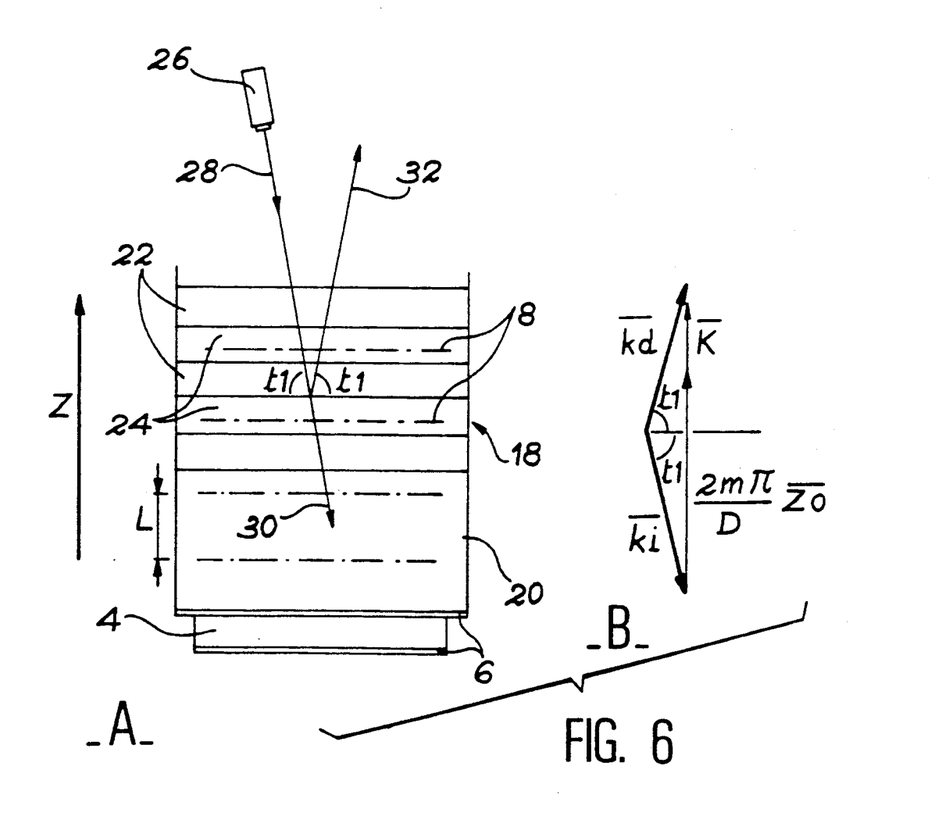

FIG. 6A shows a unit acousto-optical cell according to the invention having a superlattice 18 formed on a substrate 20. The superlattice 18 is a stack of alternating layers 22 and 24. The thickness of the layers 22 is designated d1 and that of the layers 24 d2 with $D=d1+d2$. In this case the transducer 4 is placed against the free face of the substrate 20. By means of a laser 26, a light beam 28 is directed onto the free face of the superlattice, which is assumed to be transparent to the light of the laser of wavelength 1, with D only differing slightly from $\frac{1}{2}$. The incident beam 28 forms an angle t1 (close to 90°) with the planes of waves 8 resulting from the excitation of the transducer 4. The transmitted beam 30 and the diffracted beam 32 also form angles t1 with said planes 8.

The Fabry-Pérot optical resonance effect in a superlattice when the light wave vector is close to the edge of the Brillouin minizone has already been demonstrated. The light energy density in the superlattice is much greater than that of the incident beam at the resonance condition. It is therefore possible to expect a very pronounced acousto-optical interaction in the superlattice.

FIG. 7 shows the variations of the ratio of the diffraction efficiency nSL in a GaAs-AlAs superlattice (d1=84 nm, d2=56 nm, N=150) to the nGaAs diffraction efficiency of solid GaAs, as a function of the wavelength 1 of light. The interaction in the superlattice is in the quasi-colinear configuration, whilst in the case of solid GaAs, the light beams and the sound wave are quasi-perpendicular (under Bragg incidence). The efficiencies in the two cases are compared assuming that the acousto-optical interaction length and the acoustic power are the same. P1 and P2 correspond to the first two resonance peaks. FIG. 7 shows that the diffraction efficiency in the superlattice can reach values 800 times higher than those of the diffraction efficiency in solid GaAs.

The diffraction efficiency is highly dependent on the structure of the superlattice. In a GaAs-AlAs superlattice, it varies as a function of the relative thickness X of the AlAs layer (X being equal to the thickness of the AlAs layers divided by the period D). The greatest diffraction efficiency occurs when $X=0.4$. This value is linked with the refraction indices and the ratio of the photoelastic constants of the two constituent materials.

The effect of the confinement of the optical energy in the superlattice permits a very effective interaction of the light with the ultrasonic wave in a relatively small coupling length L ($L=N.D$) compared with the case of homogeneous media. This leads to a very large pass band DF, such that $DF=v/L$, v being the acoustic speed in the medium. For an e.g. 20 micrometer thick superlattice, DF is approximately 250 MHz, which cannot be obtained with the known devices using solid media.

Figure 8:
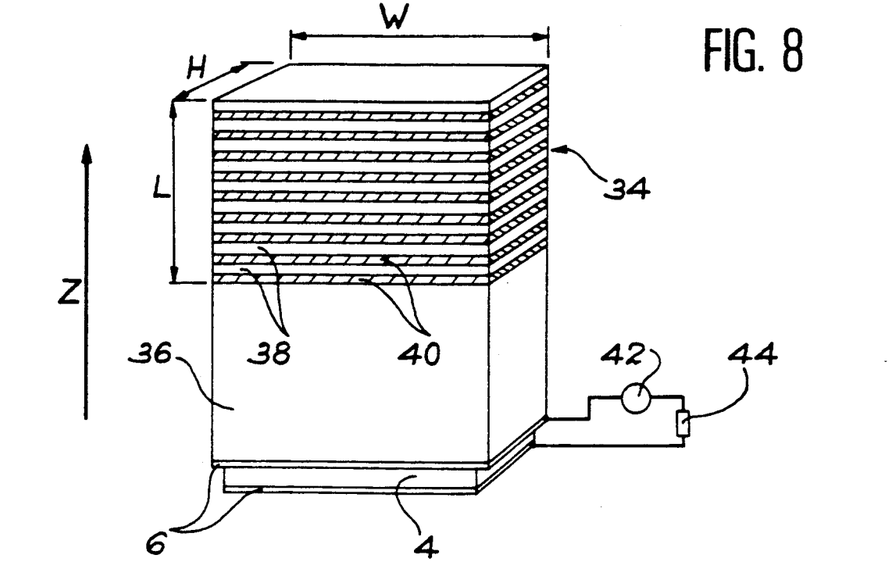
FIGS. 8, 8A 9 Diagrammatic views of embodiments of the device according to the invention using volume sound waves.

FIG. 8 diagrammatically shows a device according to the invention. It is an acousto-optical modulator having a superlattice 34 formed on a substrate 36. For example, the substrate is of GaAs, the superlattice is a stack of alternating layers, respectively of GaAs (layers 38) and AlAs (layers 40). The number of periods is designated N. The transverse dimensions of the superlattice are designated H and W. The piezoelectric transducer 4 is fixed to the free surface of the substrate 36. This free surface is perpendicular to the superlattice axis Z (which was also the case with the device shown in FIG. 6A). A voltage generator 42, having an electric matching means 44, makes it possible to apply a voltage between the electrode 6 of the transducer 4.

When a not shown laser beam illuminates the free surface of the superlattice under a certain angle of incidence, due to the high refractive indices of the semiconducting materials constituting the superlattice, the incident beams within said superlattice are almost perpendicular to the layers. The incident light beam and the ultrasonic beam are quasi-colinear and the not shown diffracted beam is directed in a direction opposite to the incident beam (contradirectional diffraction). The wavelength of the light is close to the optical forbidden band (stop band) of the superlattice and is accurately adjusted so that the resonance condition is satisfied. The reflection of the light by the superlattice is then at a minimum in the absence of an ultrasonic wave. When an ultrasonic wave is injected into the superlattice by the transducer, a diffracted beam is produced. The intensity of the diffracted beam is dependent on the acoustic power. Thus, light modulation is brought about.

In a purely indicative and non-limitative manner, the parameters of the device of FIG. 8 have the following values:
Number of layers: $d(GaAs)=84$ nm, $d(AlAs)=56$ nm.
Number of periods: $N=150$.
Total superlattice thickness: $L=ND=21$ micrometers.
Substrate thickness: $d(substrate)=0.5$ mm.
Transducer thickness: $d(LiNbO_3)=15$ micrometers.
Electrode thickness:: $e<0.1$ micrometer.
Lateral dimensions: $W=1$ mm, $H=1$ mm.
Optical working wavelength: $l=886$ nm.
Centre frequency of voltage applied: $f=500$ MHz.
Voltage applied between electrodes: approximately 10 V.
Impedance matching: $R=50$ ohms.
Modulator pass band: $DF=v/L=250$ MHz (acoustic speed $v=5000$ m/s).
Dimensions: $1\times1\times0.5$ mm$^3$.

A large number of devices according to FIG. 8 can be regrouped in the form of bidimensional arrays on the same substrate.

Figure 8A:
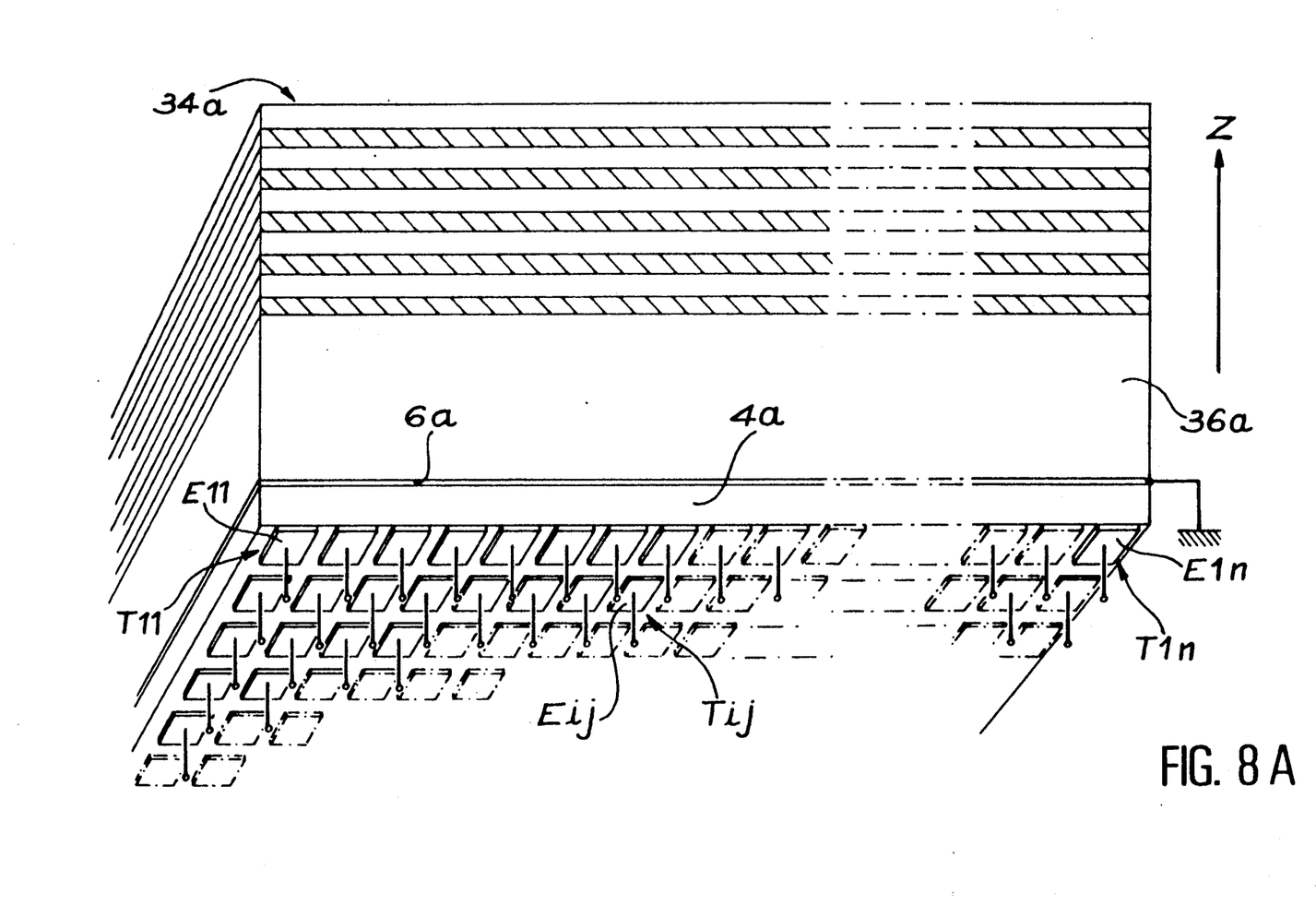

An embodiment of this type is diagrammatically shown in FIG. 8A. The device shown comprises a superlattice 34a formed on one face of a substrate 36a. The other substrate face carries a piezoelectric plate or strip 4a. One face of the latter carries an electrode 6a on the side of the substrate and the other face carries an array of electrodes E11 . . . Eij. Each electrode is e.g. shaped like a rectangle having dimensions substantially equal to H and W (cf. FIG. 8).

For the use of the device shown in FIG. 8A, the electrode 6a can be earthed or grounded, whilst the electrodes E11 . . . Eij are raised to voltages V11 . . . Vij independently of one another by appropriate, not shown means. It can therefore be considered that there is an array of elementary acousto-optical cells in monolithic form and each associated with an elementary piezoelectric transducer T11 . . . Tij. Thus, by supplying to the free face of the superlattice 34a a laser beam of wavelength l to which the superlattice is transparent (with D the period of the superlattice close to ½), the acoustic wave produced in each unit cell interacts with that part of the laser beam facing the unit cell in order to modulate said part.

The face of the substrate carrying the electrode 6a can be parallel to the layers of the superlattice 34a or can be slightly inclined with respect to said layers (as in the case of FIG. 9 described hereinafter).

Figure 9:
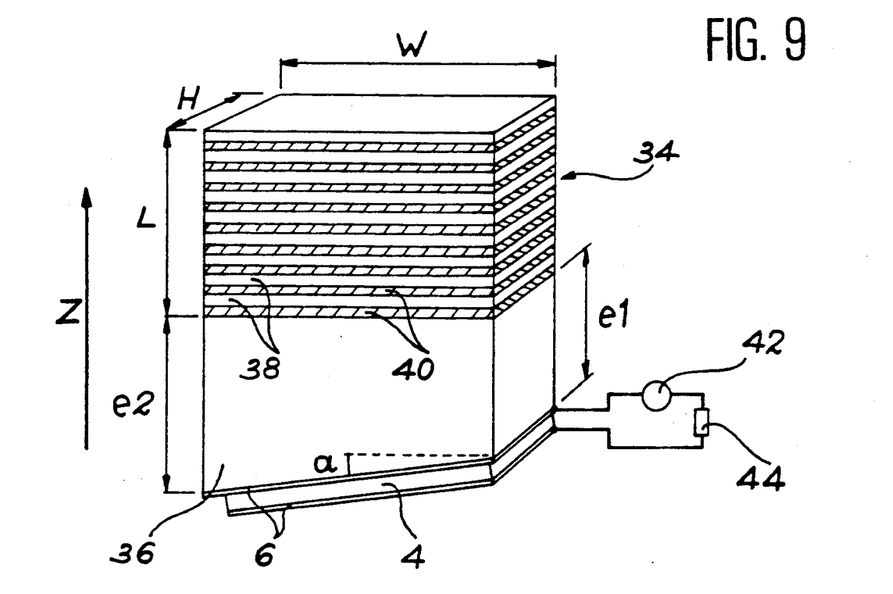

FIG. 9 diagrammatically shows another device according to the invention.

It is an acousto-optical deflector differing from the device shown in FIG. 8 by the fact that the transducer is inclined by an angle a with respect to the superlattice layers, the free substrate surface forming the angle a with said layers. The light from the not shown laser is transmitted to the free surface of the superlattice perpendicular to said surface. In the presence of the ultrasonic wave (which propagates along a direction forming an angle a with the superlattice growth axis Z), the beam is diffracted in a direction slightly deflected with respect to the superlattice axis Z. The deflection angle varies with the frequency of the ultrasonic wave. Thus, the deflection of the beam can be brought about by changing the frequency of the voltage applied between the electrodes 6.

In a purely indicative and non-limitative manner, the parameters of the device of FIG. 9 have the following values:
Layer thicknesses: $d(GaAs)=84$ nm, $d(AlAs)=56$ nm.
Number of periods: $N=150$.
Total superlattice thickness: $L=ND=21$ micrometers.
Lateral dimensions: $W=10$ mm, $H=2$ mm.
Angle of inclination of the substrate: $a=5°\,42''$ (e11 = 0.5 mm, e2 = 1.5 mm).
Transducer thickness: $d(LiNbO_3)=15$ micrometers.
Electrode thickness: $e<0.1$ micrometer.
Optical working wavelength: $l=886$ nm.

Voltage applied between electrodes: approximately 10 V.

Impedance matching: R=50 ohms.

Centre frequency of voltage applied: f=500 MHz.

Pass band: DF=v/L=250 MHz (acoustic speed v=5000 m/s).

Accessible deflection angle of the diffracted beam: dt=(l/L)tga=0.25'.

Number of separable deflection positions: Ns=(W/L)tga=50.

Access time: T=(W/v)sin$^2$a=0.2 microsecond.

Dimensions: $10 \times 2 \times 1.5$ mm$^3$.

Figure 10:
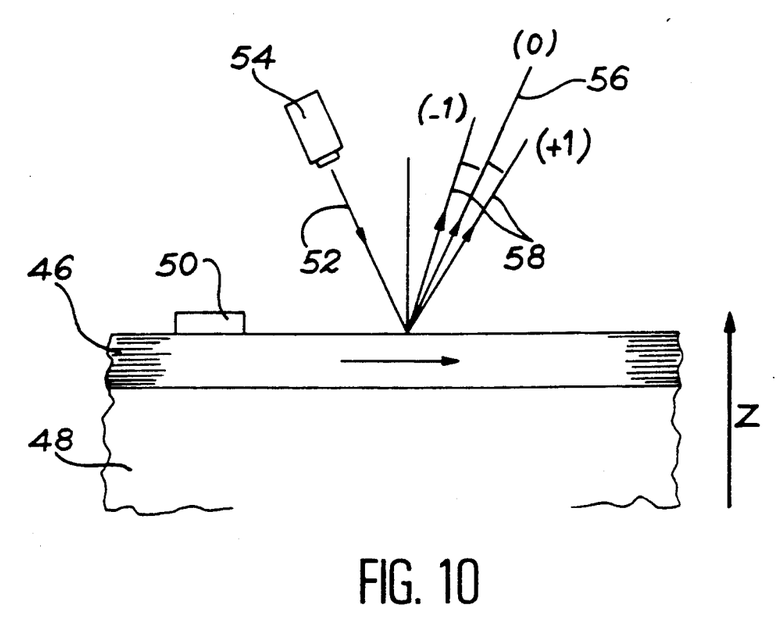
FIG. 10 A diagrammatic view of another embodiment of the device according to the invention using surface sound waves.

FIG. 10 diagrammatically shows another device according to the invention comprising a superlattice 46, e.g. of GaAs-GaAlAs on an e.g. GaAs substrate 48. The free face of the superlattice is provided with a surface sound wave transducer 50 which, when excited, produces surface sound waves in the superlattice 46. Thus, these surface waves are initially propagated parallel to the superlattice layers. For example, use is made of an intedigitated transducer formed on the free surface of the superlattice, which is piezoelectric. A light beam 52 from laser 54 is transmitted to the free surface of the superlattice 46. A laser is chosen, which has an emission wavelength l to which the superlattice is transparent with D close to ½ (D=superlattice period).

In the absence of surface sound wave propagation, a reflected beam 56 is obtained and, in the presence of surface sound waves, deflected beams 58 are obtained, whose direction is dependent on the frequency of the surface sound waves.

Figure 11:
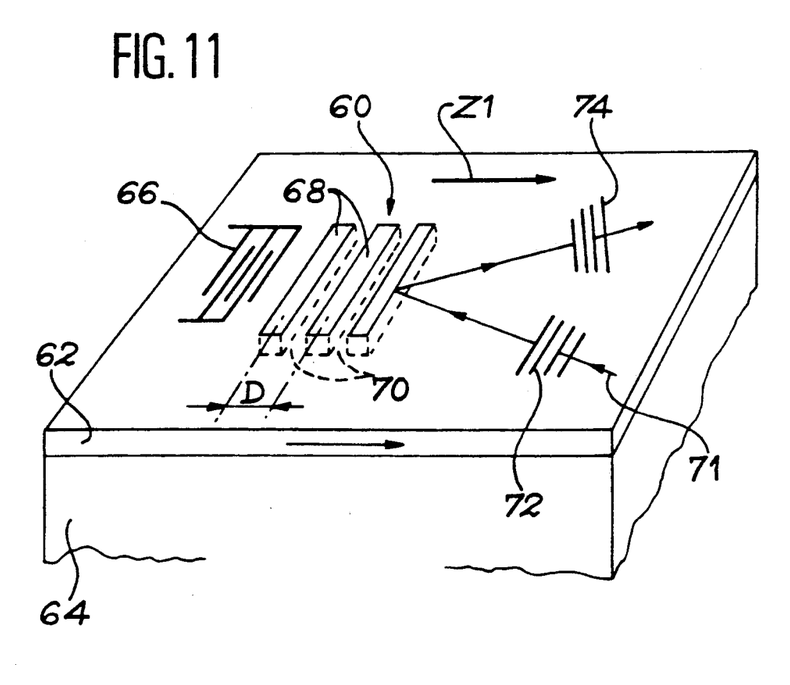
FIG. 11 A diagrammatic view of another embodiment of the device according to the invention using a lateral superlattice and surface sound waves.

FIG. 11 diagrammatically shows another device according to the invention, which comprises a lateral superlattice 60 formed on an optical waveguide 62, which is itself formed on a substrate 64. A surface sound wave transducer 66 is located on the free surface of the wave guide 62 facing the lateral superlattice 60. The latter comprises a succession of parallel strips 68 of a given material, alternating with strips 70 of another material and parallel to the strips 68. When the waveguide is made from a piezoelectric material, the transducer 66 is e.g. an interdigitated transducer whose teeth are parallel to the strips 68 and 70 and which is controlled by not shown means. The strips 68 have a width d1 and the strips 70 a width d2 with d1+d2=D (lateral superlattice period). The thickness of the strips 68 and 70 is that of the waveguide.

In a purely indicative and non-limitative manner, the substrate is of Ga$_{1-x}$Al$_x$As, the waveguide of Ga$_{1-y}$Al$_y$As with y<x and the strips 70 are made from the material constituting the waveguide, whilst the strips 68 are of Ga$_{1-z}$Al$_z$As with z differing from y. The strips 68 are obtained by etching spaced parallel zones in the form of strips in the waveguide 62 over its entire length and following this the deposition in each etched zone of Ga$_{1-z}$Al$_z$As.

A light beam 71 is confined in the waveguide and injected into it obliquely with respect to the superlattice and from the side of said superlattice opposite to that which is faced by the transducer 66, e.g. by means of an input diffraction grating 72. The sound waves produced by the interdigitated transducer 66 propagate on the surface of the device and interact with the light beam. The latter is diffracted by the sound wave in the superlattice and can then be extracted from the waveguide, e.g. by means of an output diffraction grating 74.

In this way it is possible to obtain an acousto-optical modulator (the intensity of the reflected beam being dependent on the electric power supplied to the interdigitated transducer). By forming a transducer inclined with respect to the superlattice axis Z1, an acousto-optical deflector obtained (the angle of the deflected beam being dependent on the frequency of the voltage applied between the terminals of the interdigitated transducer). Thus, devices are obtained, whose characteristics (pass band, speed, capacity, efficiency, etc.) are similar to those of the devices according to the invention using volume sound waves.

The optical resonance used in the present invention for producing an acousto-optical device can also be used in other devices, more particularly electrooptical devices and non-linear optical devices.

CITED DOCUMENTS (1) J. Sapriel, "Acousto-optics", John Wiley and Sons, New York, 1979

(2) J. He, B, Djafari-Rouhani, J. Sapriel, "Theory of light scattering by longitudinal-acoustic phonons in superlattices", Phys. Rev. B37,4086(1988)

(3) J. Sapriel, J. He, B. Djafari-Rouhani, R. Azoulay, F. Mollot, "Coupled Brillouin-Raman study of direct and folded acoustic modes in GaAs-AlAs superlattices", Phys. Rev. B37, 4099(1988)

(4) R. J. Simes, R. H. Yan, R. Geels, L. A. Coldren, J. H. English, and A. C. Gossard, "Fabry-Perot multiple-quantum well index modulator", Appl. Optics 27,2103(1988)

(5) R. Kuszelewicz, J. L. Oudar, L. C. Michel, and R. Azoulay, "Monolithic GaAs/AlAs optical bistable etalons with improved switching characteristics", Appl. Phys. Lett.53, 2138(1988)

(6) R. W. Dixon, "Photoelastic properties of selected materials and their relevance for applications to acoustic light modulators and scanners", J. of Appl. Phys.38, 5149(1967)

We claim:

1. Acousto-optical device having a photoelastic interaction medium between an incident light beam and at least one sound wave, as well as means (4, 50, 66) for producing the sound wave, characterized in that the interaction medium is a superlattice (18, 34, 46, 60) transparent to the light beam and whose period is close to an integral multiple of half the wavelength of the light beam in the superlattice.

2. Device according to claim 1, characterized in that at least one of the materials constituting the superlattice (18, 34, 46, 60) has a high acousto-optical merit factor at least equal to approximately ten times that of silica.

3. Device according to claim 1, characterized in that the superlattice (18, 34) is formed on one face of a substrate (20, 36), whose other face, called the free face, carries the means (4) for producing the sound wave.

4. Device according to claim 3, characterized in that the free face of the substrate (20, 36) is parallel to the superlattice layers (38, 40).

5. Device according to claim 3, characterized in that the free face of the substrate (36) is inclined with respect to the superlattice layers (38, 40).

6. Device according to claim 1, characterized in that the means for producing the sound wave incorporate a piezoelectric transducer.

7. Device according to claim 1, characterized in that it comprises an array of piezoelectric transducers (Tij) for respectively producing sound waves which are independent of one another.

8. Device according to claim 1, characterized in that the superlattice (46) is formed on one face of a substrate (48) and carries the means (50) for producing the sound wave, the latter incorporating a surface sound wave transducer able to produce in the superlattice sound waves propagating parallel to the superlattice layers.

9. Device according to claim 1, characterized in that it also comprises a substrate (64) and an optical waveguide (62) carried by the substrate, in that the superlattice (60) is a lateral superlattice formed in the waveguide and in that the latter carries means (66) for producing the sound wave, said means incorporating a surface sound wave transducer able to produce in said lateral superlattice sound waves propagating parallel to the axis of the lateral superlattice or obliquely with respect thereto.

10. Device according to claim 1, characterized in that the superlattice (18, 34, 46, 60) is a semiconducting superlattice.

11. Device according to claim 1, characterized in that the light beam is a laser beam.

* * * * *